(12) United States Patent
Krishnaswamy et al.

(10) Patent No.: US 7,051,367 B1
(45) Date of Patent: May 23, 2006

(54) DYNAMICALLY CONTROLLING PACKET PROCESSING

(75) Inventors: Umesh Krishnaswamy, Sunnyale, CA (US); Balakrishna Raghunath, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1013 days.

(21) Appl. No.: 09/854,810

(22) Filed: May 14, 2001

(51) Int. Cl.
*G06F 11/30* (2006.01)
*G06F 15/16* (2006.01)

(52) U.S. Cl. .................................. 726/22; 709/223
(58) Field of Classification Search ................ 713/200, 713/201; 709/223–229; 718/100, 102, 103, 718/104
See application file for complete search history.

(56) References Cited

U.S. PATENT DOCUMENTS 6,301,668 B1 * 10/2001 Gleichauf et al. .......... 713/201
6,499,107 B1 * 12/2002 Gleichauf et al. .......... 713/201
6,519,703 B1 * 2/2003 Joyce .......................... 713/201
6,816,973 B1 * 11/2004 Gleichauf et al. .......... 713/201

* cited by examiner

*Primary Examiner*—Christopher Revak
(74) *Attorney, Agent, or Firm*—Shumaker & Sieffert, P.A.

(57) ABSTRACT

A router includes a detection module to detect a presence of the network attack, such as a denial of service (DOS) attack. The detection module may, for example, include counters indicating a number of packets processed for various network protocols supported by the router. The detection module enables a rate-limiting operating mode for the router when one or more of the counters exceed a protocol-specific threshold. Under normal traffic levels, the router receives inbound packets using interrupt-driven service routines. When a network attack is detected, however, the router dynamically switches modes and processes the packets using a finely controlled software process. This allows the software process to control the computing resources allocated to servicing packets during a network attack, thereby reserving sufficient resources for lower priority software processes to process the packets and service other tasks.

14 Claims, 5 Drawing Sheets

DYNAMICALLY CONTROLLING PACKET PROCESSING

TECHNICAL FIELD

The invention relates to computer networks and, more particularly, to improving resistance to network attacks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain tables of routing information that describe routes through the network. A "route" can generally be defined as a path between two locations on the network. Upon receiving an incoming data packet, the router examines destination information within the packet to identify the destination for the packet. Based on the destination, the router forwards the packet in accordance with the routing table.

A conventional routing device can be susceptible to a network attack, such as a denial of service (DOS) attack, that occurs when a malicious party directs a high volume of packets to the routing device in an attempt to sabotage network operation. The high traffic volume can overwhelm the routing device, leaving it unable to process the inbound packets. For example, in one type of DOS attack, a perpetrator sends a large number of "ping" requests to network broadcast addresses, which are special addresses used to broadcast messages to other devices on the network. When sending the requests, the perpetrator spoofs the source address of a routing device targeted by the attack. In response to the requests, the other network devices reply to the targeted routing device, thereby inundating the targeted routing device with packets.

SUMMARY

In general, the invention reduces the vulnerability of a routing device to a network attack, such as a denial of service (DOS) attack. Under normal conditions, the router receives inbound packets using high-priority, interrupt-driven service routines. This allows the router to receive and buffer the inbound packets with minimal overhead. After queuing the inbound packets, lower priority software interrupts process the packets according to a corresponding network protocol.

When a network attack is detected, however, the router dynamically switches modes and invokes the service routines using a finely controlled software process, instead of using software interrupts. This allows the software process to control the computing resources allocated to servicing packets during a network attack, thereby reserving sufficient resources for lower priority software processes to process the packets and service other tasks.

In one embodiment, the invention is directed to a method in which a router dynamically selects between a first mode of processing inbound packets using interrupt service routines and a second mode of processing the inbound packets using a controlled software process. The router detects the presence of a network attack and dynamically selects between the first and second modes based on the detection of the network attack.

In another embodiment, the invention is directed to a method in which a router receives inbound packets from a network. The router processes the packets using a software process, and controls a rate that the software process uses computing resources to process the packets. The software process may control the usage rate by determining an execution period that the software process has executed without a context switch and pausing execution of the software process for a sleep period when the execution period exceeds a threshold. The router may dynamically adjust the sleep period during a network attack.

In another embodiment, the invention is directed to a router comprising a detection module to detect the presence of a network attack. The router includes a network interface to receive a packet from the network and a routing engine to selectively process the packet using a software process or an interrupt-driven service routine based on the detection of the network attack. The detection module may include counters indicating a number of packets processed for various network protocols supported by the router. The detection module may enable a rate-limiting operating mode of the routing engine when one or more of the counters exceed a protocol-specific threshold.

In another embodiment, the invention is directed to a computer-readable medium containing instructions. The instructions cause a programmable processor to set a rate-limiting operating mode based on a traffic level of the inbound packets, and to selectively invoke the packet service routine based on the rate-limiting operating mode by either calling the packet service routine from the software process or by issuing a software interrupt.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
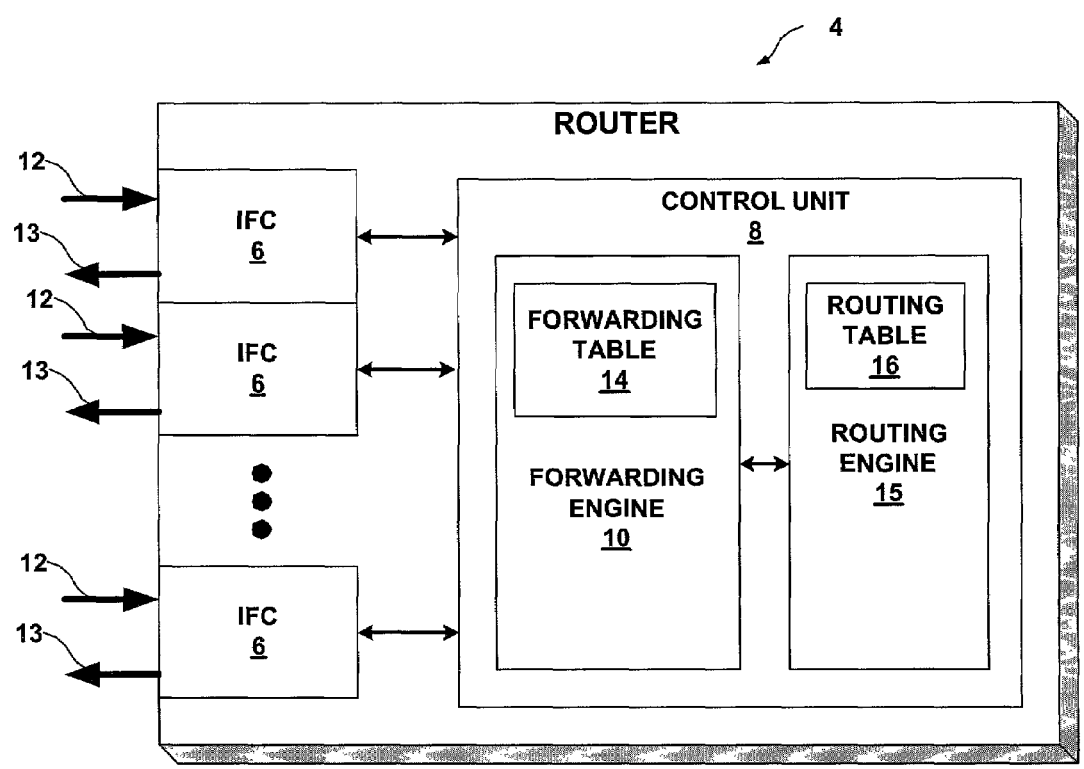
FIG. 1 is a block diagram illustrating an example router configured consistent with the principles of the invention.

FIG. 1 is a block diagram illustrating an example router 4 configured consistent with the principles of the invention. Generally, router 4 receives an inbound packet, determines a destination for the received packet, and outputs the packet using one or more interface cards (IFCs) 6 based on the destination.

In the exemplary embodiment illustrated in FIG. 1, router 4 includes one or more IFCs 6 for sending and receiving packets via network links 12 and 13. Control unit 8 forwards inbound packets received from inbound link 12 to the appropriate outbound link 13 in accordance with routing information stored in routing table 16.

In one embodiment, control unit 8 may comprise a routing engine 15 and a forwarding engine 10. Routing engine 15 maintains routing information within one or more routing tables 16 to represent a network topology and, based on routing tables 16, creates forwarding table 14 associating network addresses to specific interface ports at IFCs 6. Forwarding engine 10 receives forwarding table 14 from routing engine 15. Upon receiving an inbound packet, forwarding engine 10 determines the destination address of the inbound packet, looks up in forwarding table 14 the interface port associated with the destination address, and forwards the inbound packet to the appropriate IFC 6 for transmission. The example architecture of router 4 is for exemplary purposes only; the invention is not limited to this architecture. In alternate embodiments, router 4 may be configured in a variety of ways. In one embodiment, router 4 control unit 8 and its correspond functionality may be replicated and incorporated directly within IFCs 6.

Router 4 periodically receives packets that do not need to be forwarded to other destinations, but that need to be processed by routing engine 15. For example, routing engine 15 may support a number of protocols, such as the Border Gateway Protocol (BGP), for exchanging route information with other routing devices. Routing engine 15 processes the BGP packets and updates routing table 16. In addition, routing engine 15 may support a number of other network protocols. For example, routing engine 15 may support Address Resolution Protocol (ARP), which is a TCP/IP-based protocol for converting an IP address into a physical address, such as an Ethernet address. As another example, routing engine 15 may support Telnet or other similar protocols to provide an interface for remote configuration.

Under normal traffic levels, routing engine 15 services inbound packets using interrupt-driven service routines. A hardware interrupt is triggered, for example, when routing engine 15 receives an inbound packet, causing routing engine 15 to invoke an interrupt service routine (ISR) in response. Typically, the ISR is a high-priority routine that, when invoked, disables other interrupts and includes a minimal amount of code to read the inbound packet and place the packet within a protocol-specific queue for processing. Prior to exiting, the ISR typically triggers a lower priority software interrupt for invoking protocol-specific routines for processing the queued packet.

In response to the software interrupt, a second interrupt handler is invoked that extracts the packet from the head of the queue, examines header information of the packet and processes the packet according to an appropriate networking protocol such as ARP or TCP. More specifically, in response to the software interrupt, the second interrupt handler may process an inbound packet by calling a protocols-specific service routine. In this manner, under normal traffic levels, routing engine 15 services inbound packets using an interrupt-based scheme that requires minimal processing overhead.

When a network attack is detected, however, routing engine 15 dynamically switches operating modes and services inbound packets using a finely controlled software process. More specifically, routing engine 15 monitors traffic levels of inbound packets for the various protocols and, when one or more traffic levels exceed protocol-specific thresholds, services the packets using a controllable software process executing within a multithreaded operating environment. In other words, instead of invoking service routines using software interrupts, routing engine 15 invokes a software process, which in turn calls the service routines. The software process typically operates at an even lower priority to process the packets according to the corresponding protocol. Dynamically switching to the software process when a network attack is detected provides many advantages, including, for example, allowing the software process to control the computing resources used by the service routines, thereby reserving sufficient computing resources for other low priority processes. When the network attack is no longer detected, routing engine 15 returns to the interrupt-driven scheme to minimize the overhead in processing inbound packets.

Figure 2:
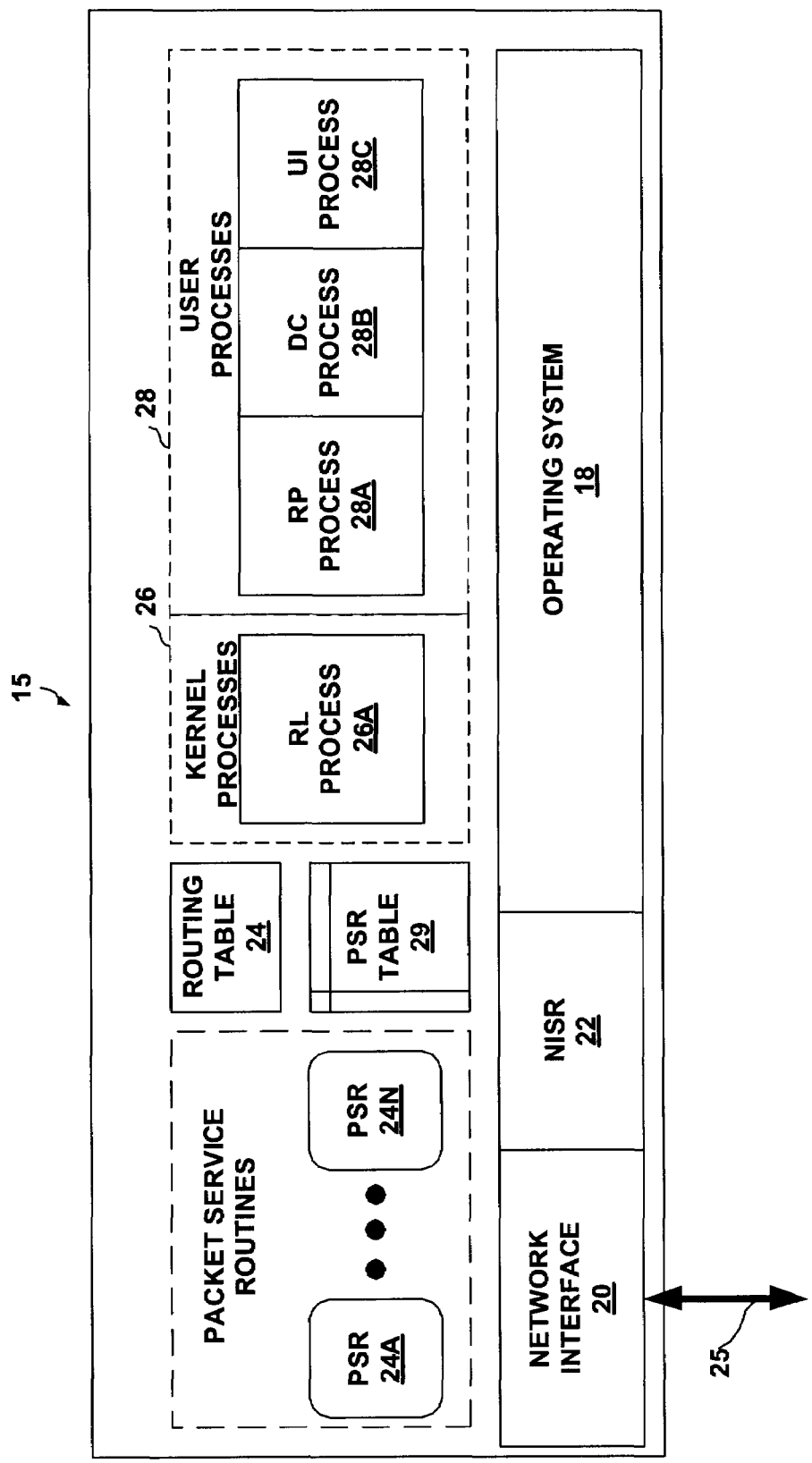
FIG. 2 is a block diagram illustrating an example routing engine consistent with the principles of the invention.

FIG. 2 is a block diagram illustrating an example routing engine 15 consistent with the principles of the invention. Routing engine 15 may comprise an operating system 18 executing on a programmable processor (not shown). Operating system 18 provides a multi tasking operating environment for execution of a number of processes including kernel processes 26 and user processes 28. An example of such an operating system is FreeBSD, which is an advanced UNIX operating system that is compatible with a number of programmable processors, including processors from Intel Corporation™.

User processes 28 may comprise a routing protocols (RP) process 28A that includes one or more threads that implement the various protocols supported by routing engine 15. RP process 28A may include, for example, threads that implement protocols for exchanging route information with other routing devices and for updating routing table 16 (FIG. 1). RP process 28A may also include threads to support other protocols, such as threads that implement a TCP/IP network stack. User processes 28 may also comprise a device configuration (DC) process 28B that controls the physical configuration of router 4. Other examples of user processes 28 include a user interface (UI) process 28C that provides an interface by which a remote system administrator or script can control and configure router 4.

Operating system 18 typically executes user processes 28 at the same priority as kernel processes 26. Kernel processes 26 may include rate limiting (RL) process 26A that, as described below, finely controls the computing resources used to process inbound packets during a network attack.

Routing engine 15 includes network interface 20 that provides a hardware interface for receiving and transmitting packets. Network interface 20 may be, for example, a network interface card (NIC) coupled to IFC's 6 (FIG. 1), or forwarding engine 10, via an internal, packet-switched network 25. Upon receiving a packet, network interface 20 generates a hardware interrupt, causing operating system 18 to invoke network interrupt service routine (NISR) 22.

NISR 22 retrieves inbound packets from network interface 20 and buffers the packets for processing. Under normal traffic levels for inbound packets received by routing engine 15, NISR 22 issues a protocol-specific software interrupt, causing operating system 18 to invoke one of packet service routines (PSR's) 24A–24N, collectively referred to as PSR's 24. In particular NISR 22 analyzes the incoming packet, sets a corresponding protocol bit within a protocol data structure and issues a software interrupt, thereby invoking the appropriate PSR 24 based on the type of packet received. Each PSR 24A–24N may service a particular protocol type, such as IP, ARP, MLPS, ISIS, PPP and ATM.

NISR 22 monitors traffic levels of incoming packets received from network interface 20 in order to detect network attacks. Upon detecting a network attack, NISR 22 continues to retrieve incoming packets from network interface 20, but does not issue software interrupts to directly invoke an appropriate one of PSR's 24. Instead, NSIR 22 issues a "wake-up" signal directing operating system 18 to invoke RL process 26A. In response, operating system 18 typically places RL process 26A in the ready state, such as by placing RL process 26A in an internal "run" queue.

Upon execution, RL process 26A scans the protocols data structure to determine the type of packets queued, searches PSR table 29, which maintains pointers to each of PSR's 24, and invokes an appropriate one of PSR's 24 to process the queued inbound packets. In this manner, routing engine 15 uses a kernel process to invoke PSR's 24 during a network attack, instead of using software interrupts. RL process 26A can finely control the consumption of computing resources during the attack and, therefore, reserve sufficient resources for user processes 28. In this manner, RL process 26A ensures that user processes 28, such as RP process 28A, have sufficient resources to process the incoming packets, even during network attacks when traffic levels are designed to overwhelm routers.

Figure 3:
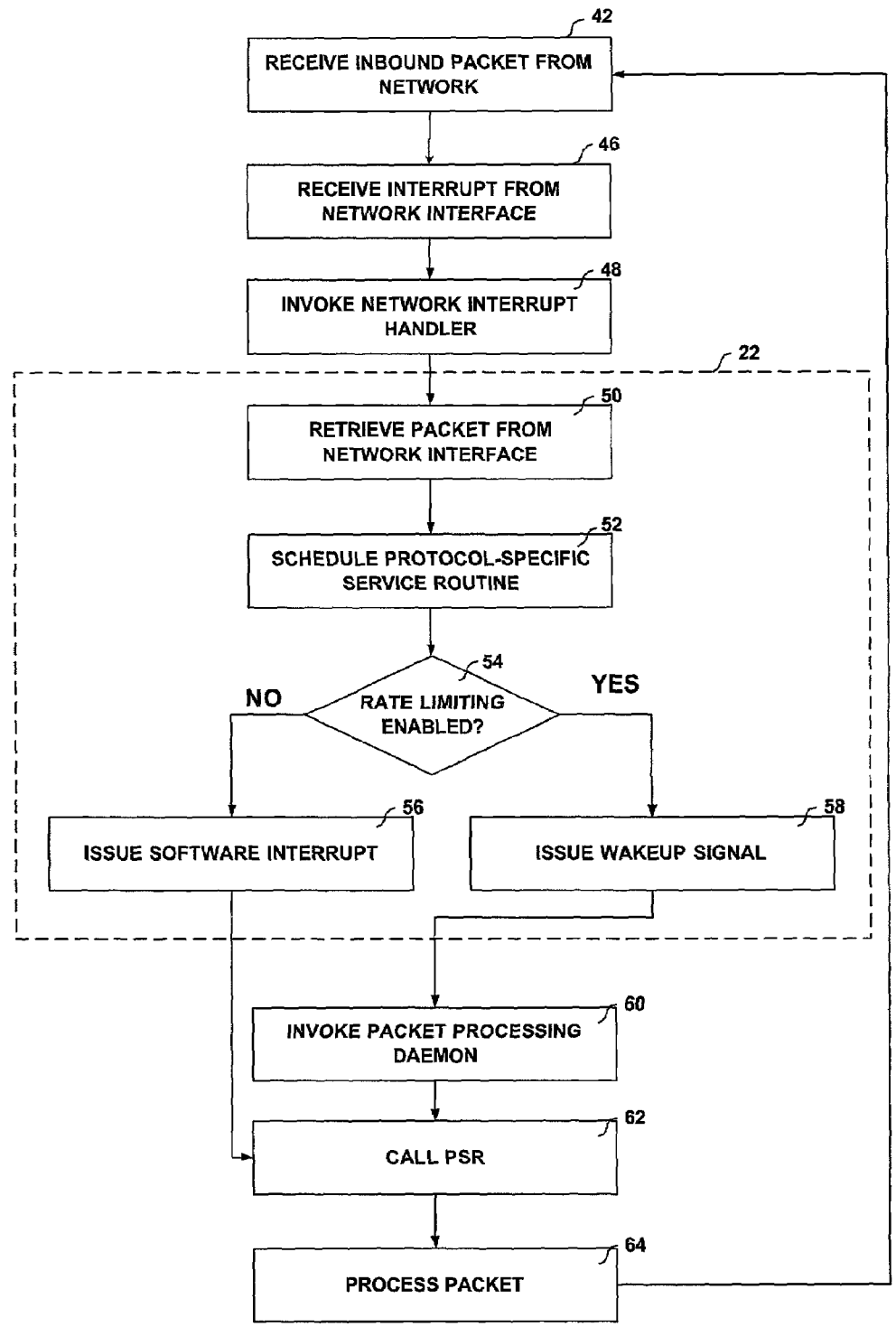
FIG. 3 is a flowchart illustrating an example mode of operation of a router upon receiving an inbound packet.

FIG. 3 is a flow chart illustrating an example operation of routing engine 15 consistent with the principles of the invention. Upon receiving a packet from network connection 25 (42), network interface 20 issues a hardware interrupt to routing engine 15 (46). In response, operating system 18 invokes network interrupt service routine (NISR) 22 (48), which retrieves the packet from network interface 20 and buffers the packet for processing (50).

After retrieving the packet, NISR 22 analyzes header information within the packet to determine the appropriate protocol and schedules the corresponding one of PSR's 24 (52). NSIR 22 may, for example, set a corresponding bit within a global data structure in which each bit corresponds to a protocol supported by routing engine 15.

After scheduling the appropriate PSR 24, NISR 22 checks the current operating mode of routing engine 15 to determine whether the routing engine is operating in a normal operating mode or a rate-limiting operating mode, such as when a network attack has been detected (54). If rate limiting has not been enabled, NISR 22 issues a software interrupt (56). The software interrupt causes operating system 8 to enter a higher-priority level and directly invoke the scheduled PSR (62).

If rate limiting has been enabled, however, NISR 22 does not issue a software interrupt but instead issues a wake-up signal to operating system 18, typically by making a kernel function call (58). In response to the wake-up signal, operating system 18 invokes RL process 26A (60). RL process 26A determines the scheduled PSR, typically by scanning the data structure, searches PSR table 29 for a pointer to the scheduled PSR, and calls the scheduled PSR using the pointer (62). Once invoked, PSR 24 processes the packet according to the appropriate protocol (64). In this manner, routing engine 15 dynamically selects between a first mode of processing inbound packets using interrupt-driven packet service routines and a second mode of processing the inbound packets using a software process executing within an operating environment provided by multi-tasking operating system 18.

Figure 4:
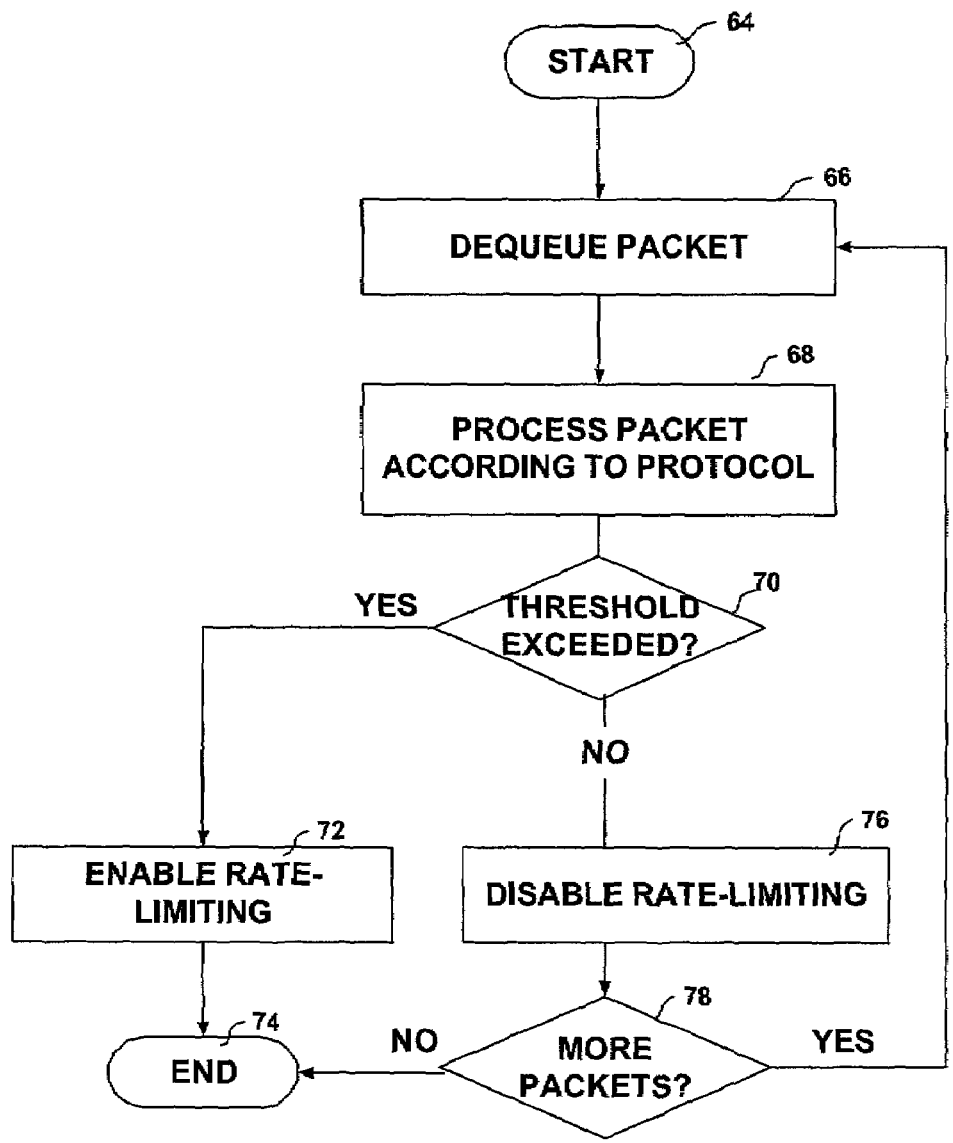
FIG. 4 is a flowchart illustrating an example operation of a packet service routine to process an inbound packet.

FIG. 4 is a flowchart illustrating an example operation of one of the packet service routines (PSR's) 26. When operating system 18 invokes one of PSR's 26, either in response to a software interrupt or a wakeup signal, the invoked PSR dequeues the inbound packet buffered by NISR 22 (66). Next, the PSR performs various protocol-specific processing of the inbound packet. For example, depending upon the protocol, the PSR may identify a protocol number embedded within the packet, assemble the packet information, verify a checksum, call an input routine for that protocol, and/or queue the packet in an appropriate queue (68).

After forwarding the packet, the PSR determines whether a rate-limiting operating mode should be enabled, such as whether the router is likely to be the target of a DOS attack (70). In one embodiment, the PSR maintains a counter indicating a number of packets that the PSR has dequeued from network ISR 22 and processed. If the number of packets is greater than a certain predefined threshold, such as 500 for IP packets or 50 for ARP packets, then the PSR determines that current traffic levels indicate that router 4 is likely the target of a network attack. In this event, the PSR enables rate limiting for the particular protocol (72) and terminates (74). If the threshold has not been exceeded, the PSR ensures that rate-limiting is not enabled (76), determines whether there are more inbound packets (78) and continues to dequeue packets until all of the packets have been processed or a rate-limiting threshold has been exceeded. In this manner, packet service routines 24 monitor traffic levels for inbound packets and dynamically sets an operating mode for routing engine 15.

Figure 5:
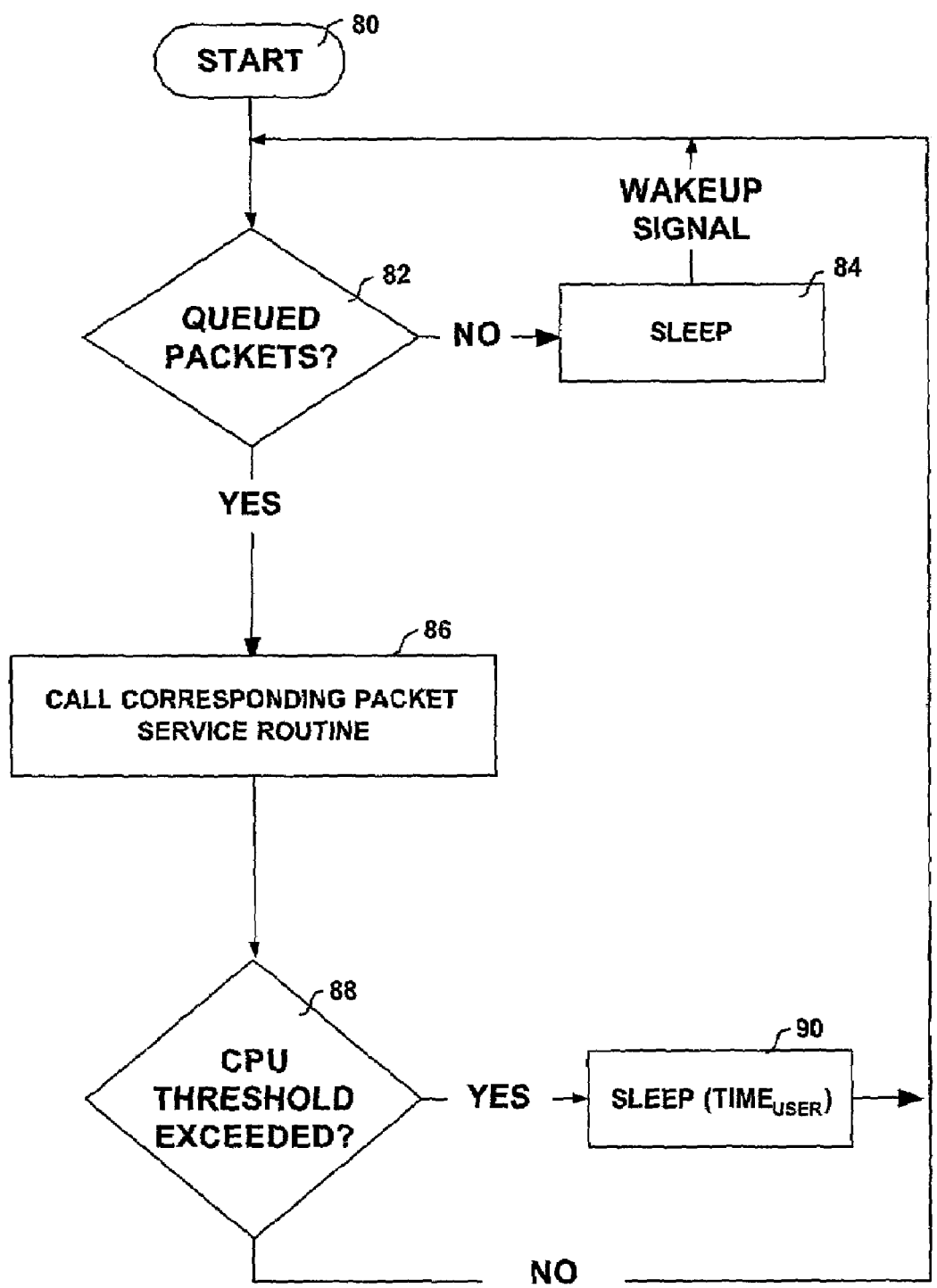
FIG. 5 is a flow chart illustrating an example mode of operation for a rate-limited software processes for invoking a packet service routine.

FIG. 5 is a flow chart illustrating an example mode of operation for rate limiting (RL) process 26A. Upon being invoked by operating system 18 (80), RL process 26A determines whether there are any inbound packets queued for processing (82). As described above, in one embodiment, NISR 22 sets a corresponding bit within a data structure according to the type of packet received, i.e., the protocol to which the packet conforms. In this embodiment, RL process 26A scans the data structure to determine whether any packets are queued for processing for the various protocols supported by routing engine 15.

If there are no inbound packets queued for processing, RL process 26A executes a Sleep kernel call supported by operating system 18, and relinquishes computing resources indefinitely until awakened by operating system 18 (84). If there are inbound packets, RL process 26A selects a pointer from PSR table 29 based on the type of packet queued for processing and invokes the appropriate PSR to process the packet as described above with reference to FIG. 4 (86). In one embodiment, RL process 26A performs a function using the selected pointer to directly call the PSR.

After returning from the PSR, RL process 26A determines whether the process has exceeded a protocol-specific threshold for using computing resources (88). For example, RL process 26A may make one or more kernel calls to operating system 18 to determine a number of operating system "ticks" that the process has been executing without a context switch to another software process. If the usage threshold has not been exceeded, RL process 26A continues to process buffered packets.

If the number of ticks exceeds the usage threshold, RL process 26A executes a Sleep kernel call and relinquishes computing resources for a limited period defined by a parameter $TIME_{USER}$. In other words, RL process 26A sleeps for at least $TIME_{USER}$, and cannot be woken up by operating system 18. In this manner, RL process 26A can guarantee a predetermined amount of time for user processes 28 to process the already received packets. (90). Upon waking up, RL process 26A continues to invoke the appropriate PSR's 24 to process any buffered packets.

In one embodiment, RL process 26A adjusts the sleep period set by $TIME_{USER}$ during a network attack. RL process 26A may, for example, increase the sleep interval during an attack until a maximum sleep interval is achieved. RL process 26A may reset the sleep interval to a minimum interval when RL process 26A detects lower traffic levels indicating a reprieve from the attack.

Various embodiments of the invention have been described. The invention reduces the vulnerability of a routing device to a network attack, such as denial of service (DOS) attack, in which a malicious party directs a high volume of packets to the routing device in an attempt to overwhelm the routing device. The router dynamically switches between receiving inbound packets using an interrupt-driven scheme and using a finely controlled software process that finely controls the consumption of computing resources during the attack. In this manner, the software process ensures that other processes have sufficient resources to process the incoming packets, even during network attacks when traffic levels are designed to overwhelm routers.

The invention is not limited to handling network attacks, but can be used in a variety of situations in response to different network events. The invention, for example, can be used to rate limit packet processing during high-level traffic conditions. Such conditions may be caused by a myriad of network conditions including the temporary failure of links. These and other embodiments are within the scope of the following claims.

The invention claimed is:

1. A method for processing a network packet comprising:
    receiving inbound packets from a network;
    setting a rate-limiting operating mode based on a traffic level of the inbound packets; and
    selectively invoking a packet service routine based on the rate-limiting operating mode by:
    calling the packet service routine from a software process without issuing an interrupt when the traffic level of the inbound packets exceeds a threshold and controlling a usage rate by which the software process uses computing resources to process the packets, and
    issuing a software interrupt to invoke the packet service routing as an interrupt-driven service routine when the traffic level of the inbound packets does not exceed the threshold.

2. The method of claim 1, wherein controlling the usage rate comprises determining an execution period that the software process has executed without a context switch.

3. The method of claim 2, wherein controlling the usage rate comprises pausing execution of the software process for a sleep period when the execution period exceeds a threshold.

4. The method of claim 3, wherein pausing execution of the software process comprises dynamically adjusting the sleep period during a network attack.

5. The method of claim 1, wherein processing the packets comprises invoking a packet service routine from the software process.

6. The method of claim 1, wherein invoking the packet service routine comprises selecting a pointer to the packet service routine from a table of pointers to invoke packet service routines supporting a number of network protocols in response to an interrupt.

7. The method of claim 1, further comprising detecting a presence of a network attack.

8. The method of claim 7, wherein detecting the presence of the network attack comprises detecting the network attack based on a traffic level of inbound packets.

9. The method of claim 7, wherein detecting the presence of a network attack comprises detecting a denial of service (DOS) attack.

10. A computer-readable medium comprising instructions for causing a programmable processor to:
    receive inbound packets from a network;
    set a rate-limiting operating mode based on a traffic level of the inbound packets;
    selectively invoke a packet service routine based on the rate-limiting operating mode by:
    calling the packet service routine from a software process without issuing an interrupt when the traffic level of the inbound packets exceeds a threshold and controlling a usage rate by which the software process uses computing resources to process packets, and
    issuing a software interrupt to invoke the packet service routing as an interrupt-driven service routine when the traffic level of the inbound packets does not exceed the threshold.

11. The computer-readable medium of claim 10, wherein the instructions cause the processor to select a pointer to the packet service routine from a table of pointers to invoke packet service routines supporting a number of network protocols in response to an interrupt.

12. The computer-readable medium of claim 10, wherein the instructions cause the processor to detect a presence of a network attack.

13. The computer-readable medium of claim 12, wherein the instructions cause the processor to detect the network attack based on a traffic level of inbound packets.

14. The computer-readable medium of claim 12, wherein the instructions cause the processor to detect a denial of service (DOS) attack.

* * * * *

UNITED STATES PATENT AND TRADEMARK OFFICE
CERTIFICATE OF CORRECTION

| | | |
|---|---|---|
| PATENT NO. | : 7,051,367 B1 | Page 1 of 1 |
| APPLICATION NO. | : 09/854810 | |
| DATED | : May 23, 2006 | |
| INVENTOR(S) | : Umesh Krishnaswamy and Balakrishna Raghunath | |

It is certified that error appears in the above-identified patent and that said Letters Patent is hereby corrected as shown below:

Title Page, Item (75) Inventors: the city of residence for inventor Umesh Krishnaswamy should read --Sunnyvale--.

On Column 5, line 42, "8" should read --18--.

Signed and Sealed this

Eighth Day of May, 2007

JON W. DUDAS
*Director of the United States Patent and Trademark Office*